United States Patent
Daoust et al.

(10) Patent No.: US 12,190,261 B2
(45) Date of Patent: Jan. 7, 2025

(54) AGRICULTURAL OR INDUSTRIAL SUPPLY CHAIN DISTRIBUTED NETWORK USING MULTI-INPUT DECISION ALGORITHM

(71) Applicant: Ferme d'Hiver Technologies Inc., Brossard (CA)

(72) Inventors: Yves Daoust, Saint-Lambert (CA); Marie-José Montpetit, Boston, MA (US); Stéphane Rainville, Montréal (CA)

(73) Assignee: Ferme d'Hiver Technologies Inc., Brossard (CA)

( * ) Notice: Subject to any disclaimer, the term of this patent is extended or adjusted under 35 U.S.C. 154(b) by 163 days.

(21) Appl. No.: 17/614,029

(22) PCT Filed: Jun. 10, 2020

(86) PCT No.: PCT/CA2020/050796
§ 371 (c)(1),
(2) Date: Nov. 24, 2021

(87) PCT Pub. No.: WO2020/248053
PCT Pub. Date: Dec. 17, 2020

(65) Prior Publication Data
US 2022/0253756 A1    Aug. 11, 2022

Related U.S. Application Data

(60) Provisional application No. 62/859,862, filed on Jun. 11, 2019.

(51) Int. Cl.
*G06Q 10/04* (2023.01)
*G06Q 10/0631* (2023.01)

(52) U.S. Cl.
CPC ....... *G06Q 10/04* (2013.01); *G06Q 10/06313* (2013.01)

(58) Field of Classification Search
None
See application file for complete search history.

(56) References Cited

U.S. PATENT DOCUMENTS

| 4,992,942 A * | 2/1991 | Bauerle ............... A01G 31/00 706/930 |
| 6,178,253 B1 * | 1/2001 | Hendrickson ......... G06T 7/0004 382/110 |

(Continued)

FOREIGN PATENT DOCUMENTS

| WO | WO-0213596 A1 * | 2/2002 | ............. A01G 20/20 |
| WO | WO-2016205634 A1 * | 12/2016 | ............... A01G 9/14 |

(Continued)

OTHER PUBLICATIONS

Zella et al., Design of a micro-irrigation system based on the control vol. method, Biotechnol Agron Soc Environ, 10 n3, pp. 163-171, 2006 (Year: 2006).*

(Continued)

*Primary Examiner* — Octavian Rotaru
(74) *Attorney, Agent, or Firm* — Benoit & Cote Inc.; Charles-Andre Caron

(57) ABSTRACT

There is described a method and distributed network for managing a supply chain. At least one local production system is fed with an algorithm for producing a good or service (such as agricultural produce) over a production duration. An edge computing device, receives and treats data originating from the at least one local production system. A server periodically receives, from remote data sources, data relative to a market for the good or service, after a time period which is less than the production duration, and receives data treated by the edge computing device to perform comparisons with the data relative to the market to make a diagnostic. The diagnostic is transmitted to a machine learning module for updating the algorithm for (Continued)

production after the time period which is less than the production duration and feeding the algorithm as updated to the at least one local production system.

6 Claims, 9 Drawing Sheets

(56) References Cited

U.S. PATENT DOCUMENTS

| | | | | |
|---|---|---|---|---|
| 6,199,000 | B1* | 3/2001 | Keller | A01B 79/005 342/357.62 |
| 6,549,851 | B2* | 4/2003 | Greensides | A01C 21/007 702/2 |
| 6,928,339 | B2* | 8/2005 | Barker | A01G 25/16 239/739 |
| 7,280,892 | B2* | 10/2007 | Bavel | A01G 7/00 239/69 |
| 11,096,337 | B1* | 8/2021 | Wilson | A01G 9/246 |
| 11,483,981 | B1* | 11/2022 | Lo | A01G 31/06 |
| 11,582,927 | B1* | 2/2023 | Mizrakci | A01G 9/0293 |
| 2002/0170229 | A1* | 11/2002 | Ton | A01G 7/00 47/1.7 |
| 2003/0229434 | A1* | 12/2003 | Miedema | A01B 79/005 701/50 |
| 2005/0289051 | A1* | 12/2005 | Allin | G06Q 10/00 705/40 |
| 2007/0220808 | A1* | 9/2007 | Kaprielian | A01G 27/003 47/48.5 |
| 2008/0097653 | A1* | 4/2008 | Kaprielian | A01C 23/042 47/79 |
| 2010/0268390 | A1* | 10/2010 | Anderson | G06Q 10/06 340/5.2 |
| 2012/0042563 | A1* | 2/2012 | Anderson | G06N 5/04 43/132.1 |
| 2012/0046790 | A1* | 2/2012 | Anderson | A01M 1/2022 700/266 |
| 2014/0039697 | A1* | 2/2014 | Weiler | G05B 19/0426 700/284 |
| 2014/0229212 | A1* | 8/2014 | MacElheron | G06Q 10/063114 705/7.17 |
| 2014/0244019 | A1* | 8/2014 | Zhang | G06Q 10/0875 700/107 |
| 2014/0259920 | A1* | 9/2014 | Wilson | A01G 7/045 47/62 R |
| 2014/0298545 | A1* | 10/2014 | Vandenabeele | C12N 15/8273 536/23.6 |
| 2017/0064912 | A1* | 3/2017 | Tabakman | A01G 31/06 |
| 2017/0223912 | A1* | 8/2017 | Gagne | G01N 29/27 |
| 2018/0181894 | A1* | 6/2018 | Schneider | G06Q 40/04 |
| 2018/0206414 | A1* | 7/2018 | Goodman | A01G 9/022 |
| 2018/0213735 | A1* | 8/2018 | Vail | A01G 7/045 |
| 2018/0220595 | A1* | 8/2018 | Hancock | A01G 7/045 |
| 2018/0322426 | A1* | 11/2018 | Schmaltz | G06F 16/954 |
| 2018/0325050 | A1* | 11/2018 | Bye | A01G 25/162 |
| 2018/0330165 | A1* | 11/2018 | Halligan | H04N 23/80 |
| 2018/0330435 | A1* | 11/2018 | Garg | G06Q 40/03 |
| 2018/0359947 | A1* | 12/2018 | Millar | A01G 31/042 |
| 2019/0133026 | A1* | 5/2019 | Seaman | G06Q 50/02 |
| 2019/0141919 | A1* | 5/2019 | Kundra | G06V 20/188 348/159 |
| 2019/0208750 | A1* | 7/2019 | O'Donncha | A01K 61/90 |
| 2019/0311431 | A1* | 10/2019 | Simpson | G06F 16/248 |
| 2019/0325467 | A1* | 10/2019 | Perry | G06V 20/188 |
| 2019/0335688 | A1* | 11/2019 | Tirupathi | A01G 25/16 |
| 2019/0357458 | A1* | 11/2019 | Cordoba | A01G 9/247 |
| 2020/0074278 | A1* | 3/2020 | Santhar | G06N 3/044 |
| 2020/0100445 | A1* | 4/2020 | Saba | G06F 7/00 |
| 2020/0160459 | A1* | 5/2020 | Coolidge | G06Q 50/02 |
| 2020/0221645 | A1* | 7/2020 | Quilici | G01S 17/88 |
| 2020/0273172 | A1* | 8/2020 | Weldemariam | G06N 5/022 |
| 2020/0302556 | A1* | 9/2020 | Stacey | G06Q 10/06315 |
| 2021/0112705 | A1* | 4/2021 | Coolidge | G06Q 10/103 |
| 2021/0162162 | A1* | 6/2021 | Leirs | H05B 45/10 |
| 2021/0185885 | A1* | 6/2021 | Sibley | A01B 69/001 |
| 2021/0204490 | A1* | 7/2021 | Bartrom | A01G 9/042 |
| 2021/0248690 | A1* | 8/2021 | Colgan | G06Q 50/02 |
| 2021/0307258 | A1* | 10/2021 | Clark | A01G 9/247 |
| 2021/0360887 | A1* | 11/2021 | Neri | A01G 9/1423 |
| 2021/0398281 | A1* | 12/2021 | Lys | G06T 7/521 |

FOREIGN PATENT DOCUMENTS

| | | | | |
|---|---|---|---|---|
| WO | WO-2017085557 A1 * | 5/2017 | | A01G 25/162 |
| WO | 2019094729 | 5/2019 | | |
| WO | WO-2019094729 A1 * | 5/2019 | | G06N 3/0436 |

OTHER PUBLICATIONS

Xie et al., Detection of early blight and late blight diseases on tomato leaves using hyperspectral imaging, Scientific Reports 5, No. 1, Nov. 17, 2015 (Year: 2015).*

Zella et al., Design of a micro-irrigation system based on the control volume method, Biotechnol Agron Soc Environ, 10 n3, pp. 163-171, 2006 (Year: 2006).*

Estimated crop yield definition according to crop size, Investopedia webpages https://www.investopedia.com/terms/c/crop-yield.asp#:~:text=Crop%20yield%20is%20a%20standard,per%20acre%20in%20the%20U.S. (Year: 2022).*

International Search Report, 6 pages, Nenad Jevtic, Sep. 2, 2020.

* cited by examiner

AGRICULTURAL OR INDUSTRIAL SUPPLY CHAIN DISTRIBUTED NETWORK USING MULTI-INPUT DECISION ALGORITHM

CROSS-REFERENCE TO RELATED APPLICATIONS

This application claims benefit or priority of U.S. provisional patent application 62/859,862, filed Jun. 11, 2019, and U.S. provisional patent application 62/859,865, filed Jun. 11, 2019, which are hereby incorporated herein by reference in their entirety.

BACKGROUND

(a) Field

The subject matter disclosed generally relates to crop or plant growth monitoring technologies. More specifically, it relates to a distributed network for supply chain management and production yield planning in a context of industrial or agricultural processes.

(b) Related Prior Art

There are various ways of organizing the production of agricultural produce. There is a need to improve organization, decision making and resource allocations in a way which is consistent with the market needs.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

SUMMARY

Figure 1:
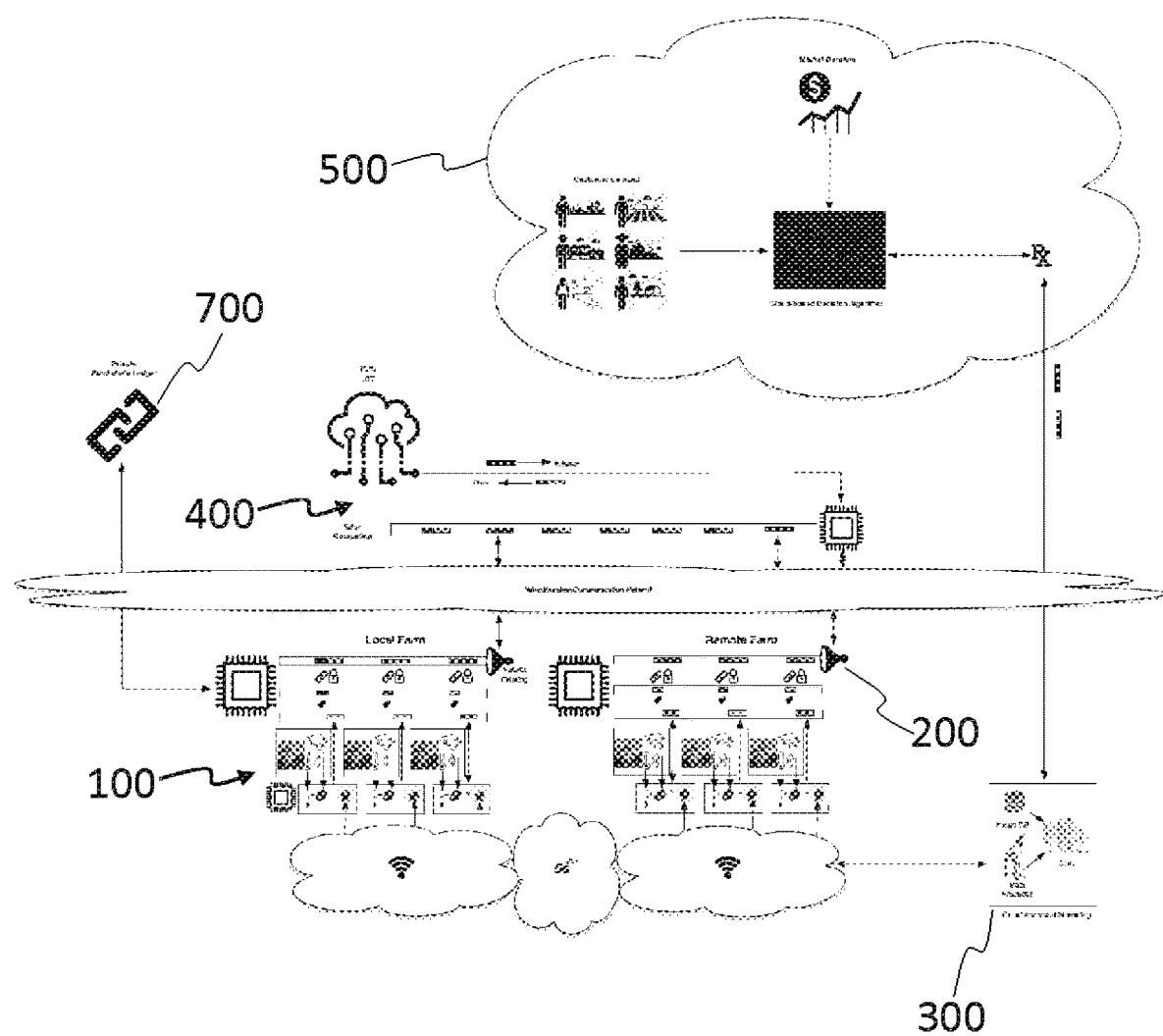
FIG. 1 is a schematic diagram illustrating the distributed network, according to an embodiment of the invention.

According to a first aspect, there is provided a method for managing a production of agricultural produce in a controlled environment comprising at least one local production system, the method comprising the steps of: collecting data originating from the at least one local production system in which the agricultural produce is produced during a production duration; at a server, periodically receiving, from remote data sources, data relative to a market for the agricultural produce, after a time period which is less than the production duration; at the server, making a prediction of a production from the at least one local production system based on the data collected therefrom; at the server, performing comparisons of the prediction with the data relative to the market to make a diagnostic; determining a level of action for the diagnostic; and transmitting the diagnostic to an appropriate address of a device in the at least one local production system corresponding to the level of action.

According to an aspect, the method further comprises formatting the data from the at least one local production system into a packet.

According to an aspect, the method further comprises verifying integrity of the packet originating from the at least one local production system using a private blockchain ledger in communication therewith.

According to an aspect, the method further comprises filtering the packet prior to transmission to perform immediate feedback in the at least one local production system when the packet is filtered as requiring the immediate feedback, and thereby avoid transmitting said packet.

According to an aspect, collecting data originating from the at least one local production system comprises collecting data on soil moisture using a soil moisture sensor, and transmitting the diagnostic to the at least one local production system comprises transmitting a diagnostic for controlling watering in the at least one local production system.

According to an aspect, collecting data originating from the at least one local production system comprises collecting visual data on the agricultural produce using a camera, and transmitting the diagnostic to the at least one local production system comprises transmitting a diagnostic for controlling a quantity of nutrients fed to the agricultural produce, a lighting intensity, or a lighting spectrum.

According to an aspect, collecting data originating from the at least one local production system comprises collecting data on air temperature or air humidity using a temperature sensor or a humidity sensor, respectively, and transmitting the diagnostic to the at least one local production system comprises transmitting a diagnostic for controlling heating, ventilation and air conditioning (HVAC) systems in the at least one local production system.

According to an embodiment, there is provided a method for managing a supply chain comprising the steps of: feeding at least one local production system with an algorithm for producing a good or service over a production duration; by an edge computing device, receiving and treating data originating from the at least one local production system; at a server, periodically receiving, from remote data sources, data relative to a market for the good or service, after a time period which is less than the production duration; at the server, receiving data treated by the edge computing device to perform comparisons with the data relative to the market to make a diagnostic; and transmitting the diagnostic to a machine learning module for updating the algorithm for producing the good or service after the time period which is less than the production duration and feeding the algorithm as updated to the at least one local production system.

According to an aspect, the method further comprises collecting the data in the at least one local production system.

According to an aspect, the method further comprises verifying integrity of data collected in the at least one local production system using a private blockchain ledger in communication therewith.

According to an aspect, collecting the data in the at least one local production system comprises collecting data on soil moisture using a soil moisture sensor, and transmitting the diagnostic to the machine learning module comprises transmitting a diagnostic for updating control of watering in the at least one local production system.

According to an aspect, collecting the data in the at least one local production system comprises collecting visual data on the good or service using a camera, respectively, and transmitting the diagnostic to the machine learning module comprises transmitting a diagnostic for updating control of a quantity of nutrients fed to the good or service, a lighting intensity, or a lighting spectrum.

According to an aspect, collecting the data in the at least one local production system comprises collecting data on air temperature or air humidity using a temperature sensor or a humidity sensor, respectively, and transmitting the diagnostic to the machine learning module comprises transmitting a diagnostic for updating control of heating, ventilation and air conditioning (HVAC) systems in the at least one local production system.

According to an aspect, the method further comprises formatting the data collected in the at least one local production system into a packet.

According to an aspect, the method further comprises verifying integrity of the packet originating from the at least one local production system using a private blockchain ledger in communication therewith.

According to an aspect, the method further comprises filtering the packet prior to transmission to perform immediate feedback in the at least one local production system when the packet is filtered as requiring the immediate feedback, and thereby avoid transmitting said packet.

According to an embodiment, there is provided a distributed network for supply chain management comprising: at least one local production system for producing a good or service over a production duration; a machine learning module which feeds the at least one local production system with an algorithm for producing the good or service; an edge computing device receiving and treating data originating from the at least one local production system; and a diagnostic module in communication with remote data sources relative to a market for the good or service for a periodic update after a time period which is less than the production duration, and further in communication with the edge computing device to receive data therefrom, adapted to perform comparisons with the remote data sources relative to the market to make a diagnostic and to transmit the diagnostic to the machine learning module for updating the algorithm for producing the good or service.

According to an aspect, the distributed network further comprises a private blockchain ledger in communication with the at least one local production system to verify integrity of data originating therefrom.

According to an aspect, the diagnostic module is operated on a cloud computing facility.

According to an aspect, wherein the machine learning module comprises a convolutional neural network.

DETAILED DESCRIPTION

Referring to FIG. 1, there is shown a schematic diagram illustrating the distributed network for managing a supply chain in an industrial or agricultural context. With respect to the agricultural context, the underlying agricultural process which takes part in the supply chain should be an agricultural process in which there is both a substantial flow of information from the status of the agricultural process and a possibility to control portions of the agricultural process, i.e., a feedback can be applied. Therefore, it applies to agricultural processes which are industrialized and information-centric in nature.

Figure 4:
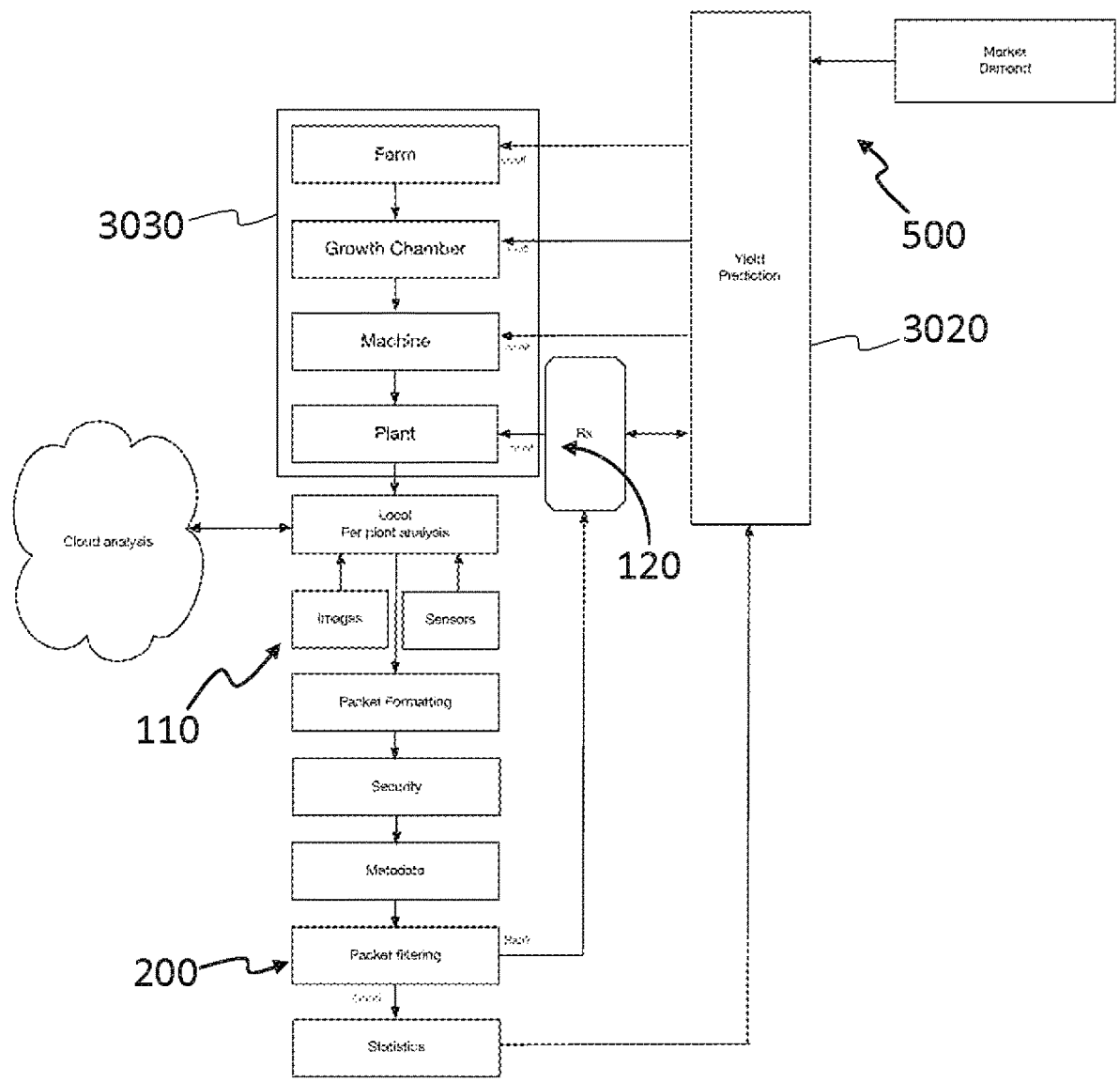
FIG. 4 is a flowchart illustrating a method for acquiring and treating data from a crop facility for yield prediction, according to an embodiment.

An information loop should be present to ensure that the agricultural processes taking place in the distributed network are monitored and ensure that they undergo feedback based on the monitoring according to the method shown in FIG. 4.

The distributed network and the corresponding method apply to a supply chain that involves the production of a good or service, including the production of agricultural produce, especially one for which a feedback can be applied during the production. The feedback implies that there should be controls for the production and a way to monitor to production process.

Figure 2A:
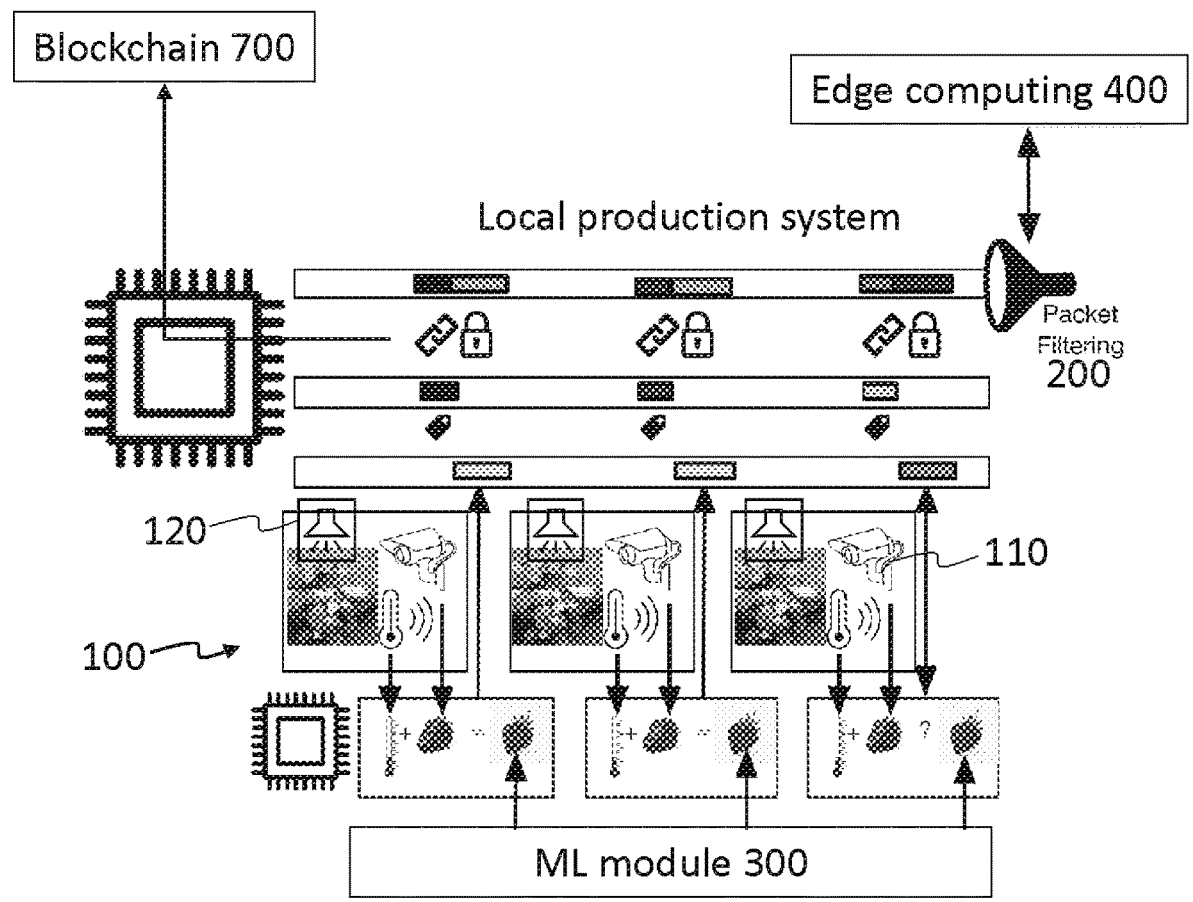
FIGS. 2A-2D are close-up views on the schematic diagram of FIG. 1, illustrating with greater detail the local production systems, the machine learning module, the edge computing device and the diagnostic module, respectively.

Therefore, the distributed network comprises a local production system 100, comprising monitoring devices 110 and controls 120, shown in FIG. 2A.

The local production should involve a good or service, such as agricultural produce (crops), for which a typical duration for production is greater than a characteristic time period of the market variability for the good or product. For example, market demand and market prices for fresh produce (fruit, vegetable, etc.) typically varies on a weekly basis, while the produce takes several weeks to grow. The local production of the produce can therefore undergo feedback depending on market considerations at the other end. Other industrial products involving production cycles which are long in comparison to a characteristic time period of the market situation can take advantage of the distributed network too.

Examples of monitoring devices 110 in the local production system 100 include, without limitation, cameras, thermometers, hygrometers, presence sensors, light sensors, speed sensors, spectrometers, etc. A plurality and a variety of such devices are normally provided in the local production system 100, in accordance with the actual good or service being produced therein.

Examples of controls 120 in the local production system 100 include, without limitation, actuators, dispensers, valves, pumps, lamps, electric switches, electric devices, machines, tools, robotic devices, etc. Again, a plurality and a variety of such devices are normally provided in the local production system 100, in accordance with the actual good or service being produced therein. Parameters of the controls 120 can be modified or modulated as part of the control being exerted. For example, the lighting applied by the lamps may be modulated in spectrum and intensity over time.

Both the monitoring devices 110 and the controls 120 are expected to have their power source and also have connections to a network (such as the internet) or to a communication channels to a computing device of some sort (local computer, edge computing device, remote server, etc.) in order to feed the data to the computing device and receive instructions therefrom, the connection being provided by an appropriate connector (Ethernet connector, WiFi connector, Bluetooth connector, etc.).

According to an embodiment, there is provided a local decision node 200 at the level of the local production system 100, shown in FIG. 2A. The local decision node 200 can be embodied as a packet filter, for example. The computing device being used as a local decision node 200 serves the purpose of acting locally for simple decision tasks, thereby saving bandwidth and data storage capacity that would otherwise be required to transmit the raw data to a remote location (i.e., a server) to arrive at the same result. Making decisions on a local computing device is more efficient both in terms of required infrastructure and also in terms of time needed to perform the controls on the local production. Therefore, the local decision node 200 acts in unison with the local production system 100, comprising monitoring devices 110 to receive raw data and controls 120 to apply the immediate control feedback. The local decision node 200 is therefore very useful to perform routine operations in the local production workflow, such as acting on the controls 120 based on the monitoring devices 110 in cases when the action to perform is obvious, such as when some value exceeds some threshold. An action is then identified without requiring particular intelligence and the local decision node 200 can then take care of the action.

Figure 2B:
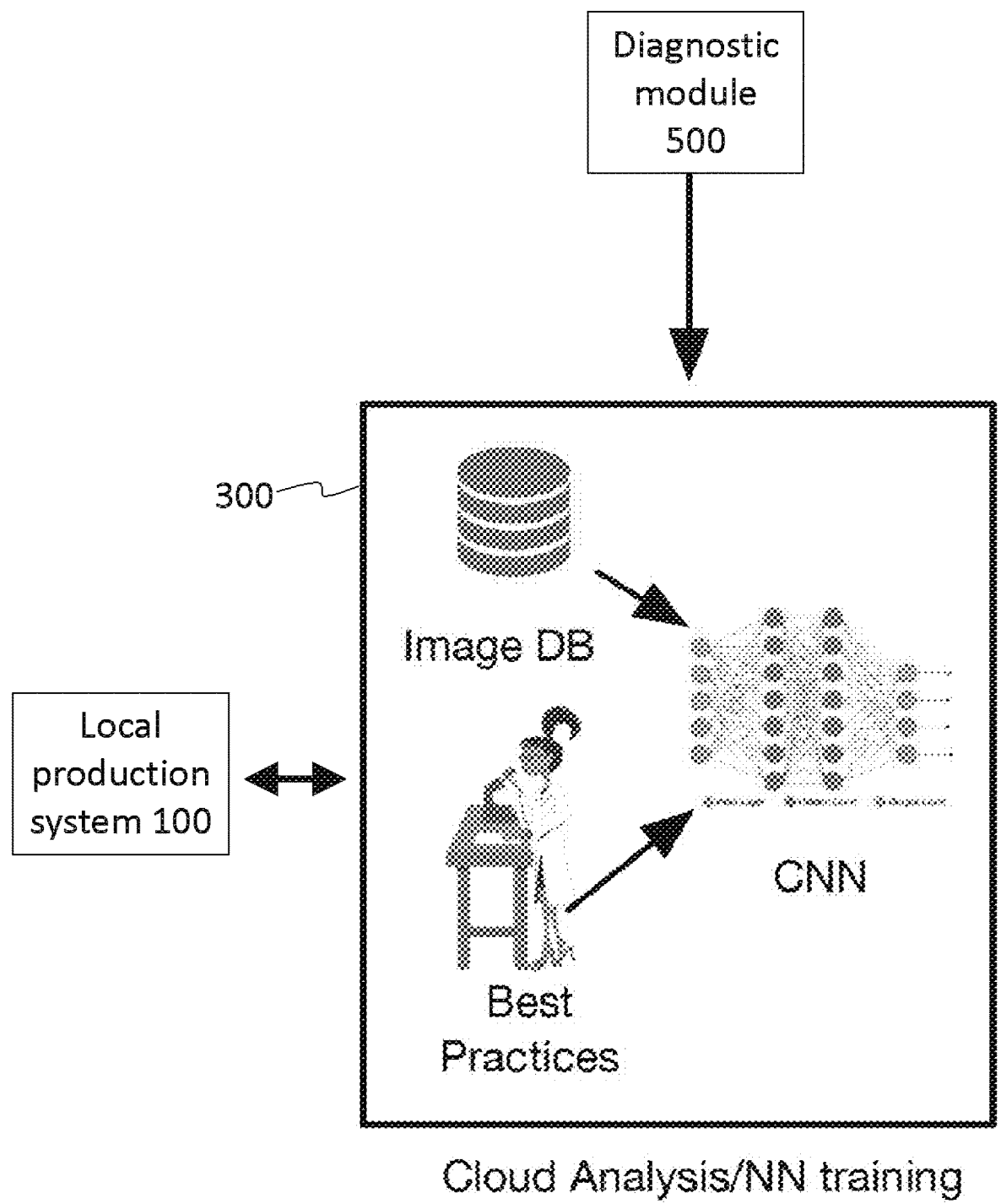

According to an embodiment, there is provided a machine learning module 300, shown in FIG. 2B, which feeds the local production system 100 with appropriate rules for production to be implemented by the local production controls 120. According to an embodiment, the machine learning module 300 comprises a neural network, which is trained using a suitable database and with operational rules such as best practices which pertain to the type of local production being managed.

For example, if the local production involves growing produce, the suitable database would comprise images of the variety of stages in plant growth and fruit/vegetable color, and the operational rules which are fed as an input of the machine learning algorithm would be best practices in growing this type of produce. In this case, growing produce involves analyzing actual images, and the machine learning algorithm can advantageously be implemented in the form of a convolutional neural network into which the actual images are fed in the appropriate format.

Figure 2C:
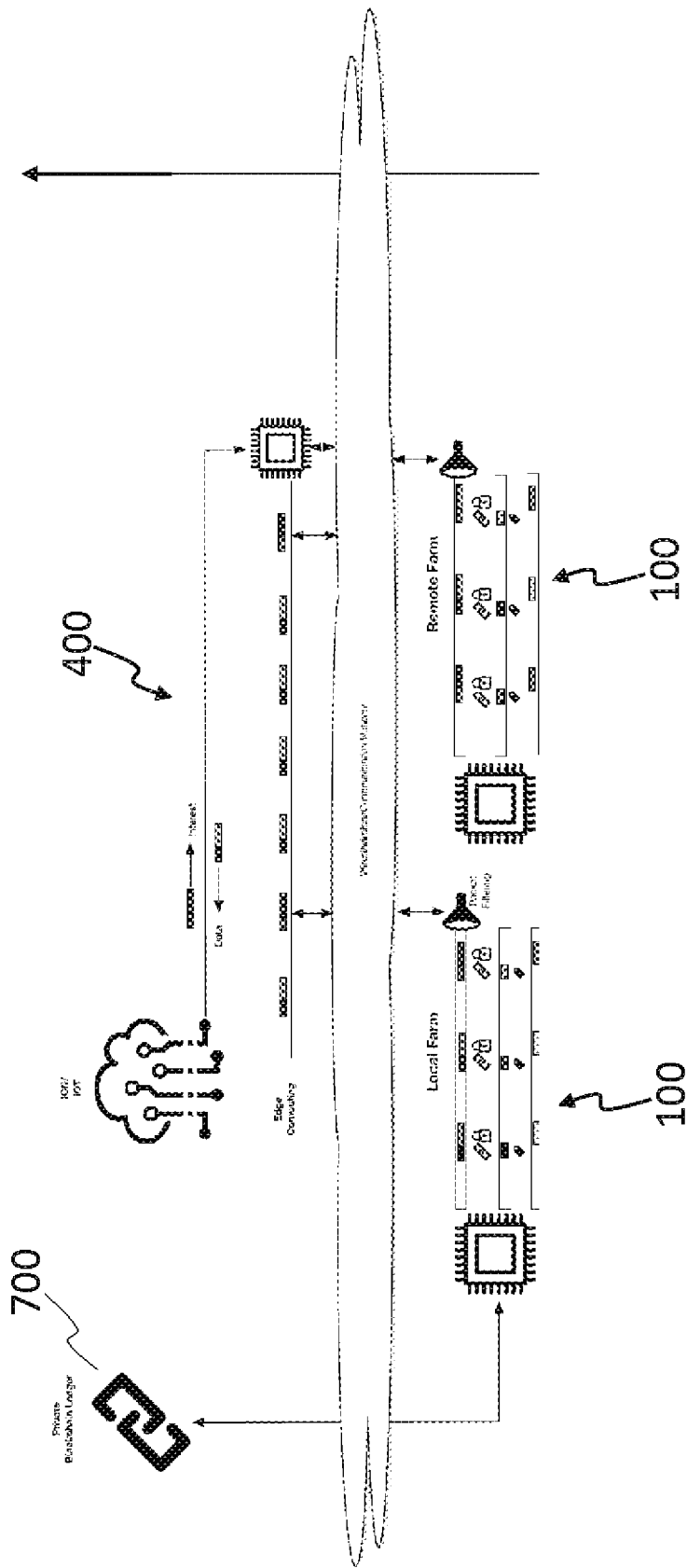

According to an embodiment, the data originating from the local process is transmitted via a network or via any other type of communication channel to an edge computing device 400, shown in FIG. 2C.

The edge computing device 400 may be adapted to perform low-level routine tasks as is the local decision node 200. More advantageously, the edge-computing device 400 is adapted to perform mid- to high-level tasks to manage the local production system 100. For example, for any data collected by the local production monitoring devices 110 that extends beyond the scope of the local decision node 200, the data should be sent using an appropriate communication channel to the edge computing device to be analyzed, such that appropriate feedback instructions are prepared by the edge computing device 400 and sent back to the controls 120 of the local production system 100 to put the feedback instructions into effect.

The edge computing device 400 is typically located on the site of the local production system 100, to avoid having to transit very large quantities of data. Indeed, the use of cameras or similar devices acting as monitoring devices 110 involves a significant quantity of data, and transmitting and/or storing such data may not be required or advantageous. Using an edge computing device 400 addresses this issue.

Now referring to FIG. 4, the flowchart illustrates a method for acquiring data from the local production system and treat the data to perform a yield prediction 3020 and take action on the controls 120 in a local production system at the appropriate level of action 3030.

The yield prediction 3020 is performed using machine learning which ingests a great quantity and variety of data collected from the local production measuring devices 110 (each one having its data tagged with their origin address in the metadata). The images, temperature, hygrometry and other data are compared to references to assess the level of maturity or health status of the plants. This comparison can be made using a knowledge base or can be made in an opaque manner, i.e., using neural networks to make prediction in conformity with the output taught by training with large datasets.

The local production monitoring devices 110 should comprise devices to capture images of the plants at the local level, i.e., cameras. The image of a plant at a given instant can be used to assess the level of maturity and general health condition of the plant and of its fruits.

The local production monitoring devices 110 should further comprise devices to capture physical data about the plants at the local level, i.e., devices to measure temperature, air humidity, soil humidity. These devices can include additional devices such as devices to measure electrical conductivity of the plants, spectrometers, and other more specialized tools. The variety of collected data and the fact that the data are collected across a large number of plants spanning over different levels of action 3030 makes the yield prediction a multi-input prediction. The fact that the data collected from remote sources relative to the market are taken into account to make a decision (decision to perform feedback using the controls 120 on a given level of action) makes the decision a multi-input decision.

All these devices which form the local production monitoring devices 110 should be connected to a network or to a computing device for analyzing the data collected by the local production monitoring devices 110.

Typically, as shown in FIG. 4, the data undergoes a step of packet formatting. Data is arranged in a specific format by the local production monitoring devices 110.

As shown in FIG. 4, there can be a step of packet filtering which follows packet formatting. Between these two steps, security checks on the data are performed, possibly using the blockchain ledger 700.

Metadata related to the local production monitoring devices 110 (e.g., device identifier, facility identifier, location, timestamp, conditions in which data is collected, etc.) is added to the other data (collected by the devices 110) being transmitted.

The step of packet filtering would be performed by the local decision node 200. This step allows making security checks easily, to have the packets transmitted over the network or not.

From the packets filtered as "good", statistics can be computed. These statistics are sent to the diagnostic module 500, or prepared by the diagnostic module 500, for yield predictions based on the statistics.

Figure 2D:
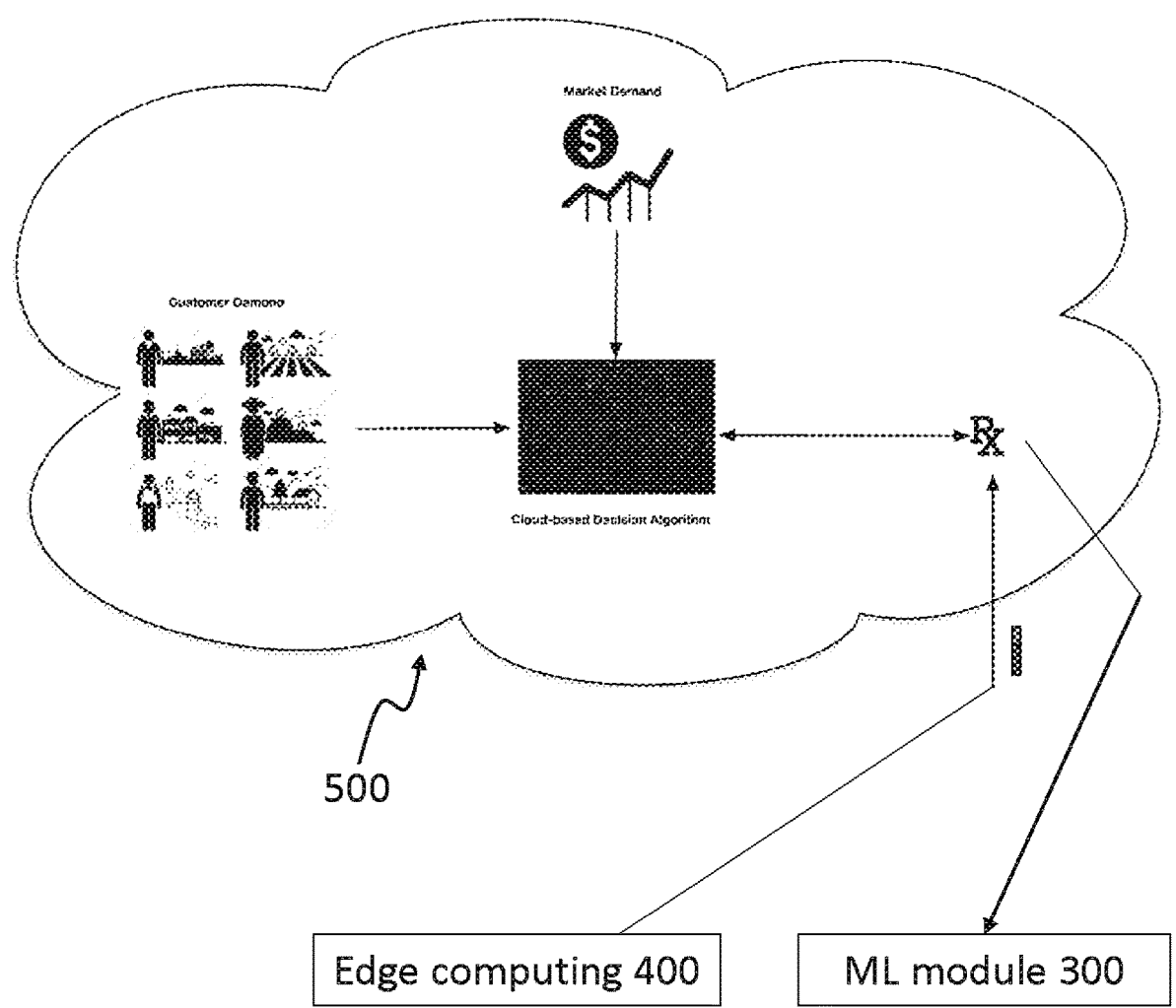

FIG. 2D illustrates a diagnostic module 500 which is used to receive relevant data from the edge computing device and eventually provide feedback instructions. The diagnostic module 500 is normally run on a server (dedicated, cloud, etc.) which is located at a remote location with respect to the local production system 100 and therefore comprises a communication channel (such as the internet network) for communication with the edge computing device 400 or with a plurality of edge computing devices 400.

More precisely, the diagnostic module 500 is used to receive, as an input, the output from the edge computing device 400 and market data, and provides as an output instructions or data for eventual application in the local process controlling devices. The market data can include, for example, market prices for the goods produced by the local processes, or indicators of customer demand.

The diagnostic module 500 can collect the market data by querying a database on a server or any other equivalent (dedicated server, cloud storage, etc.), either as a private server or a server from another party granting access to the diagnostic module 500. Other techniques may be applicable, such as a subscription to an RSS feed, web scraping, or reception of post queries from a third party to feed new market data to the diagnostic module 500. The same applies for customer demand information, which can be derived from real-time or up-to-date sales data from partnering supermarkets, for example, and accessed using similar means.

According to an embodiment, the data originating from the local monitoring devices 110 can be verified for integrity. For example, a blockchain ledger 700, which is preferably a private blockchain ledger, can be implemented to verify the integrity and origin of the data originating from the local monitoring devices. This implementation implies that a direct communication channel between the local monitoring devices 110 and the blockchain ledger 700 should be provided. As shown in FIG. 2C, the data can be collected prior to being treated by the local decision node 200, and be transmitted to the blockchain ledger 700 at this level for verification, after which it is effectively transmitted to the local decision node 200 for treatment. Otherwise, this can be assessed using other methods such as crypted communications. Ensuring the integrity and origin of data is useful to prevent industrial hacking or sabotage, or to prevent adverse effects that could result from other technical problems that can occur in the communication channels between the local monitoring devices and the other systems.

The diagnostic module 500 is adapted to determine if there are actions that need to be performed at the level of any one of the local production system(s) 100. More specifically, the diagnostic module 500 is trained to compare the activity monitored by the local production monitoring devices 110, or other information outputted by the edge computing device 400, and compare the monitored activity with the raw market data or other market indicators to determine if actions need to be applied by the local production controls 120.

More specifically, it can use a knowledge base and/or a machine learning algorithm to determine if the local production system 100 is well positioned to meet market demand. More advantageously, it can predict the production volume of the local production and compare with a market prediction at a particular date in the future, and produce instructions for the controls 120 accordingly to either meet specific criteria or to optimize sales.

Advantageously, the diagnostic module 500 can receive data from a plurality of local production systems 100, each being distinct from the others and presumably remote from each other. The diagnostic module 500 can therefore make global or total predictions taking into account all of the local production systems 100. If actions need to be performed, the instructions are given to the controls 120 of the local production system 100 for which the feedback is the most likely to be effective, or the one for which the expected monetary benefit is the highest. This is useful in cases where the cost of transportation of the produced good is high or if there is a significant disparity in the production cost between different local production systems 100.

According to an embodiment, the instructions sent by the diagnostic module 500 are not practical, low-level instructions to the controls 120, and rather comprise a prediction or representation of the plurality of local productions systems 100 and a prediction or representation of the market data.

The diagnostic module 500 then proceeds to feeding these pieces of information into the machine learning module 300, where the newly fed pieces of information are used by the machine learning module 300 as new data which modify the machine learning algorithm. Once the machine learning module 300 has integrated the new data and the new machine learning algorithm is ready, it is fed to the local production systems 100 for application by the local production systems 100 under the new version of the machine learning algorithm.

Figure 3:
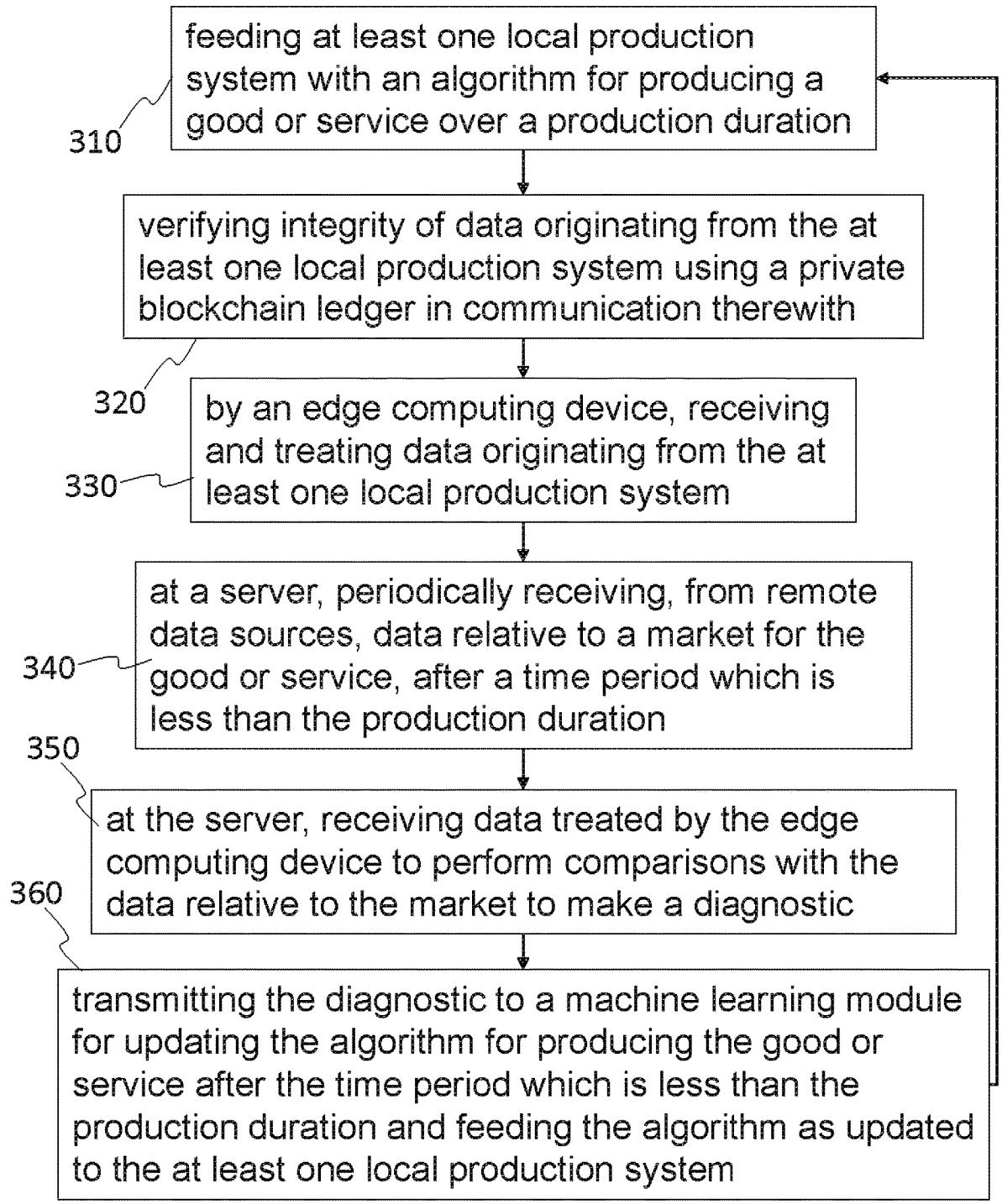
FIG. 3 is a flowchart illustrating a method for managing a supply chain, according to an embodiment.

This feedback loop is how the controls 120 at the local level are adapted to fit the constraints from the market data that are being collected and compared at the level of the diagnostic module 500, as discussed in relation with FIGS. 3-4.

The method for operating the distributed network for supply chain management is shown in FIG. 3, and comprising the following steps:

step 310—feeding at least one local production system with an algorithm for producing a good or service over a production duration;

step 320—verifying integrity of data originating from the at least one local production system using a private blockchain ledger in communication therewith step 330—by an edge computing device, receiving and treating data originating from the at least one local production system;

step 340—at a server, periodically receiving, from remote data sources, data relative to a market for the good or service, after a time period which is less than the production duration;

step 350—at the server, receiving data treated by the edge computing device to perform comparisons with the data relative to the market to make a diagnostic;

step 360—transmitting the diagnostic to a machine learning module for updating the algorithm for producing the good or service after the time period which is less than the production duration and feeding the algorithm as updated to the at least one local production system (and then, go back to step 310, as the whole process is iterative for continuous improvement).

Now referring back to FIG. 4, there is shown that when the packet is filtered as containing data which is indicative that something is not good for the plant, a treatment prescription (Rx) can be applied to the plant directly, without having to send to data through a network, as the data collected is sufficient to immediately dictate a treatment.

The treatment prescription (Rx) can otherwise be instructed by the diagnostic module after having compared the yield prediction 3020 with the market demand.

As shown in FIG. 4, the feedback is applied at the appropriate level of granularity on the facilities, i.e., level of action 3030. For example, actions can be taken for a whole farm, for a single growth chamber, for a single machine, or for a single plant. The local production controls 120 can therefore be addressed (i.e., each instance of the controls 120 has its own address such as an IP address) at the level which is right to act on a level comprises the desired group of plants in order to be more effective. For example, nutrients can be given to a given farm for which the yield prediction concludes that the yield is likely to be insufficient for the market demand, such that the productivity of that farm increases to meet the demand. If it is detected that a plant has a disease, or the plants in a single growth chamber have a disease, then a treatment can be applied to the plant or growth chamber, accordingly. Resources are therefore allocated in an optimal fashion and in accordance with a planning of the yield of a facility. The yield of a facility is also tailored, using the feedback applied through the controls, to meet the market demand, especially in a regional area of the facility (i.e., the market that the facility caters).

As mentioned above, the feedback can advantageously be provided by updating the machine learning algorithms which are applied at a given level of action in the facility. Otherwise, the instructions can also be applied more directly by instructing the controls 120 with a well-defined action instead of updating the algorithm that runs them.

Example

A practical example of a production which would benefit from the method would include strawberry production. The at least one local production systems would include a plurality of dispersed and independent facilities in which strawberries are produced, each being monitored and controlled using the distributed network.

The machine learning module 300 would first integrate images of strawberries at various stages thereof, and agronomical knowledge would be integrated into a knowledge base to know how to properly act upon the strawberry plants depending on their state. For example, the strawberries may need different substances or type of lighting depending on their stage, and some visual features of the strawberries may indicate diseases which may require action.

By feeding the algorithm from the machine learning module 300 to the local facilities, strawberry plants can be properly monitored and controlled by implementing the machine learning algorithm into the local instruments (water dispenser, nutrient dispensers, lamps, etc.). Relevant information can be sent to the edge computing device for treatment.

Reports from the edge computing device 400 are sent at a sufficient frequency to the diagnostic module, typically on the cloud or dedicated server. The diagnostic module 500 would be integrated with other partners, such as supermarket chains, to query or receive market data, such as prices for the strawberry, demands from various supermarkets, etc. A comparison would then be made to see if there is enough production available from the various facilities.

For example, the edge computing device 400 may have sent to the diagnostic module a report indicating that a disease has spread in a particular facility. The diagnostic module 500 may then compare with predictions for market data and determine that replacing or treating the plants would result in a deficit because the strawberries would be ready at a time where prices are low and the market is saturated. The diagnostic module could also determine that the market will be underserved in a particular area, with expected high prices and unmet demand, and recommend treating the plants at a particular facility which is located in that area.

To do so, the diagnostic module will integrate such a determination or diagnostic into instructions which are fed to the machine learning module 300, which will take them into account and update the algorithm. After the update, the updated algorithm is transmitted to the at least one facility for application therein.

Market data are normally collected periodically at a high frequency, after a time period (i.e., inverse of frequency) which is smaller than a production time for the strawberries, to ensure that the updates of the algorithm are applied and have an effect in a given production batch.

In the end, instructions are transmitted to the IP address of the device which belongs to the appropriate level of action for the feedback, ranging from the plant level to the farm-wide level.

Figure 5:
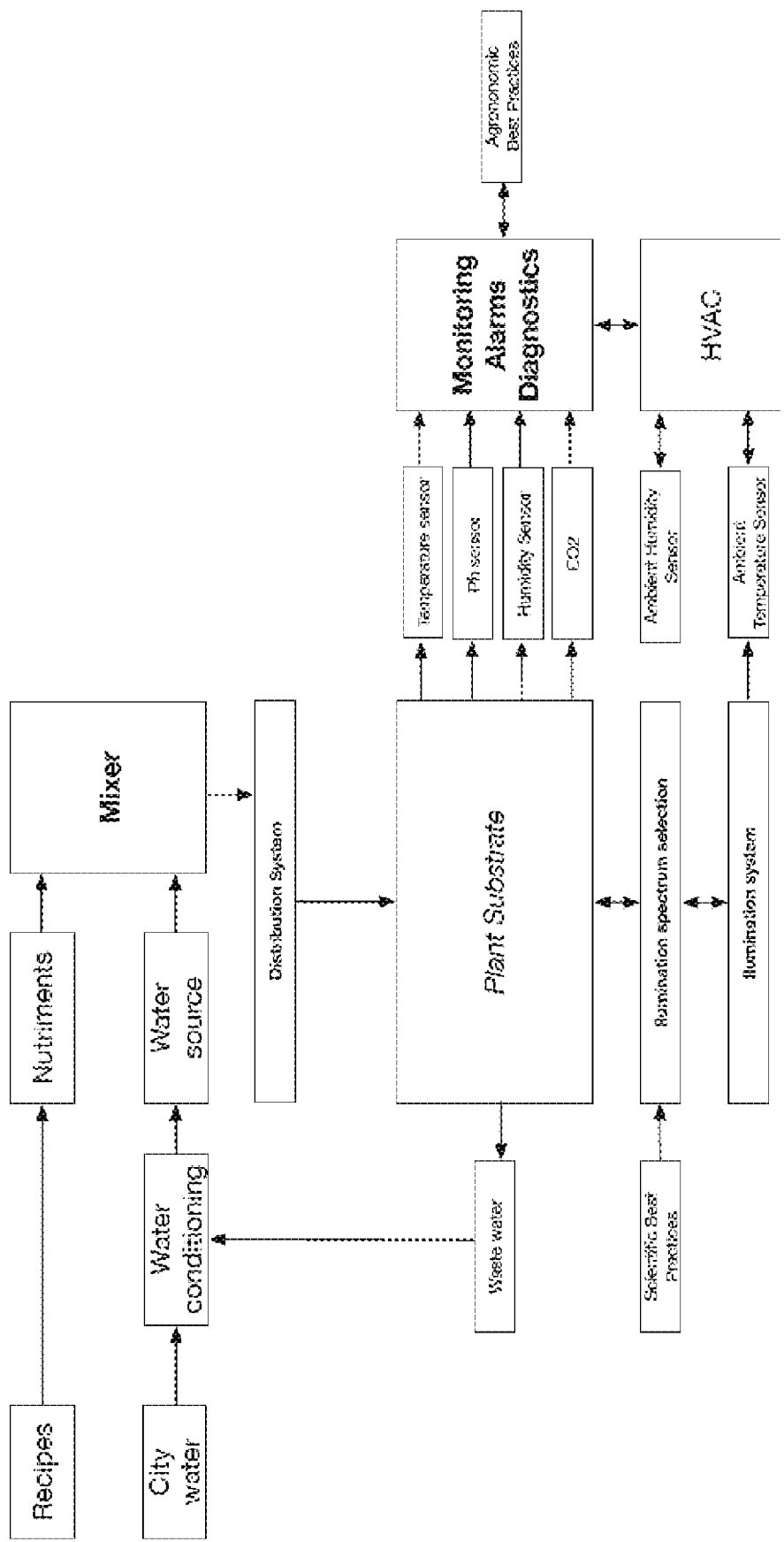
FIG. 5 is a diagram illustrating a method for monitoring and controlling a plant substrate and its environment, according to an embodiment.

FIG. 5 illustrates the example in greater detail. Each box in the diagram represents a parameter which can be acted upon, i.e., represents a control 120, or a parameter which can be measured, i.e., represents a monitoring device 110. Arrows represent relationships between these parameters.

For example, measurements are taken and actions are taken with respect to the crops, centered on the plant substrate which receives water and nutrient and is being monitored. As an example of control 120, a mixer in a facility is controlled to feed each specific plant substrate in the facility. The mixer receives water, which can be a mixture between city water and wastewater from the facility itself. After being conditioned properly based on its contents, the water is mixed with nutrients according to an appropriate recipe (quantities) of nitrogen, phosphorus and potassium compounds. A distribution system comprising piping is controlled using pumps to feed the plant substrate with water (watering) and with nutrients in appropriate quantities. The other main parameter to control is lighting, which is controlled both in intensity and in spectrum to give appropriate lighting for the plants to grow and to yield produce (such as fruit).

Still referring to FIG. 5, the plant substrate is monitored using monitoring devices 110. A temperature sensor, a pH sensor, a humidity sensor and a $CO_2$ sensor are used and provide measurements which can be analyzed using the network and method described above to ensure a proper flow of information through the network, i.e., actions are taken at the local level without having to transmit unnecessary data, while other data is transmitted remotely to monitor the facility as a whole and to update the instructions based on a high-level diagnostic of the situation (adequation between expected production and market) and also based on agronomic best practices.

Finally, each environment (not only the plant substrate but also the ambient air) can be monitored in temperature and humidity to ensure proper control of the HVAC systems (heating, ventilation and air conditioning) to maintain the environment within suitable air parameters, consistently with the operation of the illumination system.

Although not shown in FIG. 5, images acquired from cameras can be used as part of the monitoring, as already mentioned above.

Figure 6:
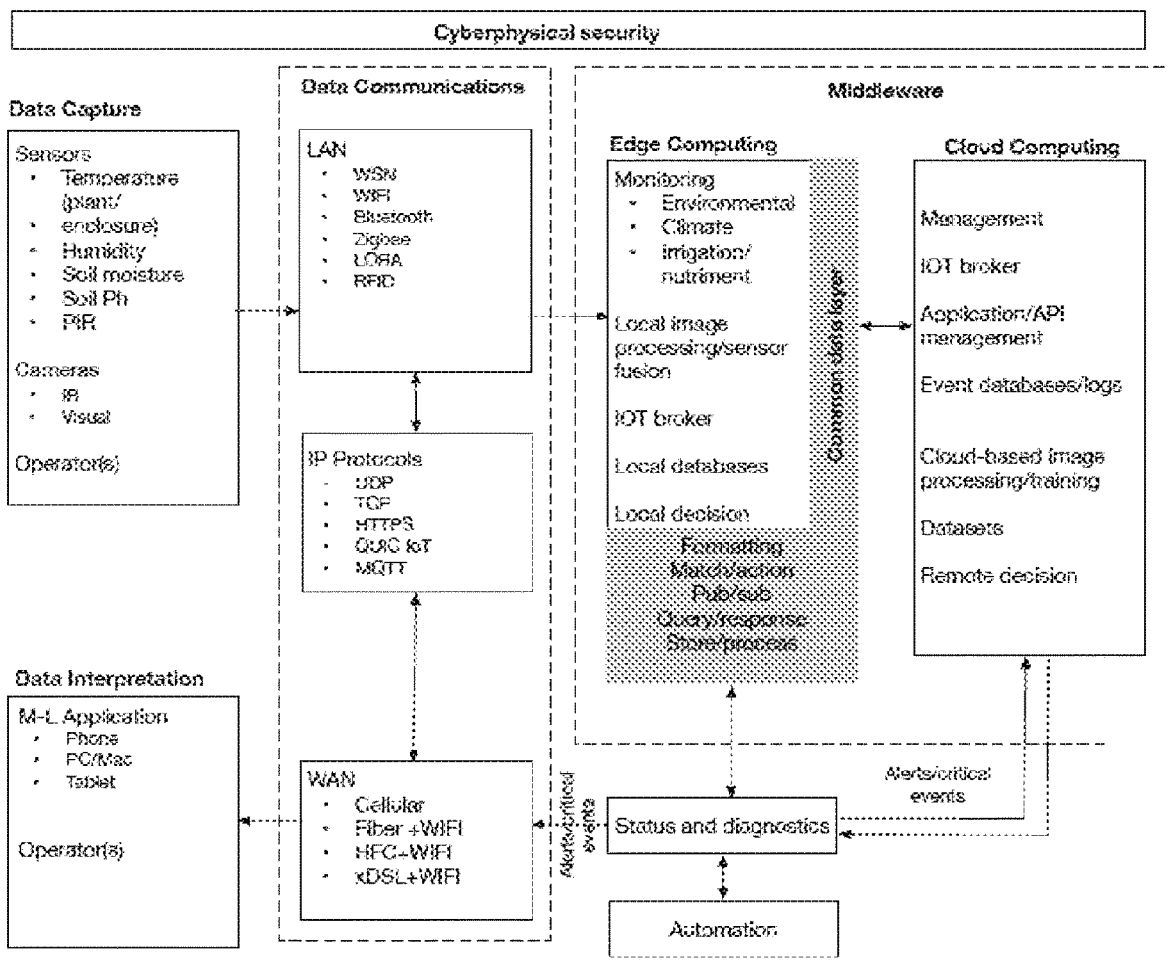
FIG. 6 is a diagram illustrating a computing and telecommunication infrastructure suitable for implementing the network and method described herein, according to an embodiment.

FIG. 6 is a diagram illustrating a computing and telecommunication infrastructure suitable for implementing the network and method described herein. Most aspects have already been mentioned above but are shown in a more formal way in FIG. 6. It should be understood that the network and method described herein seek to allow a distributed production (i.e., geographically distributed), which can allow a better matching between the local production and the local consumption, and therefore considerably reduce the transportation requirements of the produce. However, doing this creates new considerations, such as the amount of disseminated data to be acquired and analyzed. In a single traditional outdoor field, or greenhouse, the cultivator can see the production very easily. In a distributed production setting, all production units are remote from each other and a visual inspection may not suffice. Moreover, getting more quantitative measurements is useful from an agronomical perspective because production can be analyzed. Therefore, there is a challenge of transmitting and analyzing information because data is produced at various locations and can be collected at very high rates (especially images from cameras, which have a heavy file size that is hard to treat efficiently) which are difficult to transmit and to analyze properly when considering a network of several production units to be monitored and controlled from a centralized location.

The structure of computing and data processing devices and the way data is transmitted according to certain criteria reduce the load of required data transmission and makes this challenge more bearable. In other words, thanks to an iterative update of the instructions based on machine learning, instructions are implemented at a local level and reviewed repeatedly. Data-intensive acquisitions, such as images, can be treated locally based on these instructions, avoiding transmission of such data and centralized analysis. Mid-level information is transmitted to middleware, such as edge computing, which have higher processing power and is able to treat a filtered quantity of data. High-level analysis of overall production and market considerations are treated centrally and only relevant information is sent to the remote, central processing unit. The same applies to the diagnostic, which is not based on a large quantity of data, but rather on high-level data which is easier to treat.

Still referring to FIG. 6, it is shown that data capture takes place using sensors (temperature of the plant/substrate and of the air/enclosure; air humidity, soil moisture, soil pH, infrared sensors); cameras (infrared or optical spectrum), and any other type of data which can be entered by an operator via a user interface. All the data is sent to a layer of data communication which, in practice, is implemented by appropriate hardware for data communication such as the implementation of a local area network (LAN), comprising WSN, Wi-Fi, Bluetooth, Zigbee, LORA or RFID devices and implementing the appropriate protocols. IP protocols are also used (including UD, TCP, HTTPS, QUIC IoT, MATT) to switch to a wide-area network (WAN) implementing a cellular network, or using fiber, hybrid fiber-coaxial, or xDSL technologies along with the Wi-Fi connection.

This data can be sent through the WAN to a data interpretation layer embodied by a computer, in particular a client computer of any type (tabletop, laptop, tablet, phone, wearable computer, etc.), for display to the on-site operator.

Instead of having the data transmitted immediately from its site of capture to the WAN for display to the user, the data can be sent to a middleware for analysis and eventual transmission to the WAN for display to the user, as shown in FIG. 6.

The middleware comprises edge computing for receiving the data and performing, at the middleware level, the monitoring of environmental data, climate data, irrigation and nutrient data; process local images, merge or apply operations on the sensor data, and act as a local decision node, a local database and an IoT data broker with the outside. Operations such as formatting, matching, querying and getting responses, storing and processing data can be done at this level.

When necessary, the information from the edge computing can be transmitted to a remote cloud computing installation which is useful for high-level management (such as a dashboard), API management, event database, any necessary cloud-based image processing or training and the application of remote decisions.

Both the edge computing and cloud computing systems can communicate together and their output can be used to trigger a diagnostic which interacts with the automated processes that take place, and can be sed to send alerts, diagnostic or status information to the operator through the WAN described above.

A layer of security is added on top of the infrastructure, implementing, for example, the blockchain ledger described above, especially at the level of data transmission.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer implemented method of controlling treatment of a plurality of plants to timely match market demand data, the computer implemented method comprising:
  periodically collecting, from a plurality of remote sources, by a diagnostic module of a local production system, the market demand data in a market local to the plurality of plants, after a period of time which is smaller than a production time for the plurality of plants;
  capturing, by cameras of the local production system, images representing visual features of the plurality of plants to assess respective growth stages of the plurality of plants and diseases of the plurality of plants;
  capturing, by a plurality of monitoring sensors of the local production system, agronomical measurements comprising: temperature, humidity, PH, and CO2, at a substrate of the plurality of plants;
  verifying, by a ledger in communication with the monitoring sensors, an integrity and an origin of the agronomical measurements prior to treatment of the plurality of plants, by performing security checks between: a packet which performs filtering of statistics of the agronomical measurements sent to the diagnostic module for yield predictions, and a formatting of the agronomical measurements;
  training a convolutional neural network with the captured images of the plurality plants and with operational rules referring to a type of the plurality plants being managed;
  comparing, by the convolutional neural network, the images of the visual features of the plurality of plants and the agronomical measurements to the referred type of the plurality of plants being managed, to predict conformity data of the plurality of plants with a trained output taught with large datasets of agronomical knowledge assessing the respective growth stages of the plurality of plants;
  detecting, from the packet filtering of the agronomical measurements received at the diagnostic module, and from a lacking in the conformity data, that a disease has spread to the plurality of plants at the local production system;
  evaluating, by the diagnostic module, that based on the detected disease and the market demand data, the local market will be underserved;
  subsequent to said evaluating, treating the plurality of plants by:
    determining, by the convolutional neural network, from the agronomical knowledge, a need for lighting and a prescription of nutrition substances depending on the respective growth stages of the plurality of plants and the detected disease;
    controlling, by a distribution system of the local production system: an intensity and a spectrum of the lighting of an illumination system, as well as the determined nutrition substances to feed the substrate of the plurality of plants;

controlling, by the local production system, a diagnostic, heating, ventilation and air conditioning (HVAC) system, based on the agronomical measurements, in order to maintain both the substrate of the plurality of plants and air surrounding the plurality of plants consistent with operation of the illumination system.

2. The computer implemented method of claim 1, wherein the ledger verifying the integrity and the origin of the agronomical measurements is a blockchain ledger.

3. The computer implemented method of claim 1, wherein the ledger verifying the integrity and the origin of the agronomical measurements is a private blockchain ledger.

4. A system for controlling treatment of a plurality of plants to timely match market demand data, the system comprising:

a local production system configured to communicate with a diagnostic module, a plurality of cameras, and a plurality of monitoring sensors;

the diagnostic module of the local production system configured to periodically collect, from a plurality of remote sources, the market demand data in a market local to the plurality of plants, after a period of time which is smaller than a production time for the plurality of plants;

the plurality of cameras of the local production system configured to capture images representing visual features of the plurality of plants to assess respective growth stages of the plurality of plants and diseases of the plurality of plants;

the plurality of monitoring sensors of the local production system configured to capture agronomical measurements comprising: temperature, humidity, PH, and $CO_2$, at a substrate of the plurality of plants;

a ledger, in communication with the monitoring sensors, configured to verify, an integrity and an origin of the agronomical measurements prior to treatment of the plurality of plants, by performing security checks between: a packet which performs filtering of statistics of the agronomical measurements sent to a diagnostic module for yield predictions, and a formatting of the agronomical measurements;

the machine learning module, in communication with the local production system, configured to:

train a convolutional neural network with the captured images of the plurality plants and with operational rules referring to a type of the plurality plants being managed, and compare the images of the visual features of the plurality of plants and the agronomical measurements to the referred type of the plurality of plants being managed, to predict conformity data of the plurality of plants with a trained output taught with large datasets of agronomical knowledge assessing the respective growth stages of the plurality of plants;

wherein the diagnostic module is further configured to use the packet filtering of the agronomical measurements to further detect, from a lacking in the conformity data, that a disease has spread to the plurality of plants at the local production system;

wherein the diagnosis module is further configured to evaluate, based on the detected disease and the market demand data, that the local market will be underserved;

wherein, subsequent to the evaluating, the machine learning module is further configuredto execute the convolutional neural network to determine, from the agronomical knowledge, a need for lighting and a prescription of nutrition substances depending on the respective growth stages of the plurality of plants and the detected disease;

wherein, subsequent to the evaluating, the local production system further executes a distribution system to control: an intensity and a spectrum of the lighting of an illumination system, as well as the determined nutrition substances to feed the substrate of the plurality of plants;

wherein, subsequent to the evaluating, the local production system is further configured to control a diagnostic, heating, ventilation and air conditioning (HVAC) system, based on the agronomical measurements, in order to maintain both the substrate of the plurality of plants and air surrounding the plurality of plants consistent with operation of the illumination system.

5. The system of claim 1, wherein the ledger configured to verify the integrity and the origin of the agronomical measurements is a blockchain ledger.

6. The system of claim 1, wherein the ledger configured to verify the integrity and the origin of the agronomical measurements is a private blockchain ledger.

* * * * *